United States Patent
Usikov

(10) Patent No.: US 7,366,321 B2
(45) Date of Patent: Apr. 29, 2008

(54) SYSTEM AND METHOD FOR PERFORMING AUTOMATED OPTICAL INSPECTION OF OBJECTS

(75) Inventor: Daniel A. Usikov, Newark, CA (US)

(73) Assignee: Agilent Technologies, Inc., Santa Clara, CA (US)

( * ) Notice: Subject to any disclaimer, the term of this patent is extended or adjusted under 35 U.S.C. 154(b) by 691 days.

(21) Appl. No.: 10/871,963

(22) Filed: Jun. 18, 2004

(65) Prior Publication Data

US 2005/0281452 A1 Dec. 22, 2005

(51) Int. Cl.
*G06K 9/00* (2006.01)
(52) U.S. Cl. ............... 382/100; 382/147; 439/55
(58) Field of Classification Search ......... 382/100, 382/106, 108, 141, 144–145, 147–152, 168, 382/181, 193, 194, 199–203, 209–213, 255, 382/276, 274–275, 286–296, 305, 321; 348/87, 348/78, 98; 250/559.4; 439/55
See application file for complete search history.

(56) References Cited

U.S. PATENT DOCUMENTS

| | | | |
|---|---|---|---|
| 4,972,359 A | 11/1990 | Silver et al. | |
| 5,333,052 A | 7/1994 | Finarov | |
| 5,532,739 A | 7/1996 | Garakani et al. | |
| 5,640,199 A | 6/1997 | Garakani et al. | |
| 5,640,200 A * | 6/1997 | Michael | 348/87 |
| 6,330,353 B1 * | 12/2001 | Lai et al. | 382/147 |
| 6,587,581 B1 * | 7/2003 | Matsuyama et al. | 382/149 |
| 7,119,351 B2 * | 10/2006 | Woelki | 250/559.4 |
| 7,162,073 B1 * | 1/2007 | Akgul et al. | 382/149 |
| 7,221,805 B1 * | 5/2007 | Bachelder | 382/255 |

OTHER PUBLICATIONS

HALCON Application Guide 7.0 "A Milestone of Machine Vision Software", MVTec Software GmbH, 2002, 197 pages.*
HALCON Application Guide 7.0 "A Milestone of Machine Vision Software", MVTec Software GmbH, 2002, 197 pages.

* cited by examiner

*Primary Examiner*—Seyed Azarian

(57) ABSTRACT

A system and method for performing optical inspection are provided. At least one "invariant feature" of an object design is determined, and such invariant feature is used in inspecting objects having the corresponding design. An "invariant feature" is a feature that is invariant certain transformations occurring in a captured image of an object under inspection, such as brightness, color, and/or other transformations in the captured image. Accordingly, an inspection template may comprise information corresponding to at least one pre-selected invariant feature of an object's design. In certain embodiments, the template is a shape description of a feature that provides an intrinsic invariance to a specified set of basic transformations. Accordingly, the amount of pixel values stored in a template may be minimized, which minimizes the number of pixel comparisons made between a captured image of the object under inspection and the inspection template during the inspection analysis.

58 Claims, 3 Drawing Sheets

TEMPLATE FOR REGION 1

ALTERNATIVE TEMPLATE FOR REGION 1

- 401 — SUBDIVIDE DESIGN INTO REGIONS OF INTEREST
- 402 — IDENTIFY INVARIANT INSPECTION FEATURE(S)
- 403 — CREATE TEMPLATE HAVING PIXELS OF IDENTIFIED INVARIANT INSPECTION FEATURE(S) AND CORRESPONDING COORDINATES

SYSTEM AND METHOD FOR PERFORMING AUTOMATED OPTICAL INSPECTION OF OBJECTS

TECHNICAL FIELD

The below description relates in general to automated optical inspection of objects, and more particularly to systems and methods that use invariant feature(s) of an object for performing automated optical inspection analysis.

BACKGROUND OF THE INVENTION

Automated optical inspection systems are used in many applications for inspecting various types of devices to ensure, for example, that the devices satisfy certain design characteristics. For instance, in the field of electronics, various devices, such as printed circuit boards (PCBs) are often inspected using automated optical inspection systems. With such automated optical inspection systems, a device under inspection (e.g., a PCB) is imaged (e.g., to capture visual or X-ray image data thereof), and the captured image data is analyzed by a processing system to determine whether the device satisfies certain design characteristics. For example, the automated analysis of a PCB may determine whether the PCB includes certain components, whether the components are arranged properly, whether solder joints are present and of proper size/shape, etc. By performing this automated inspection to detect those devices that do not comply with certain design characteristics, devices that are not of sufficiently high quality (e.g., that are likely to fail in their operation) can be identified and filtered before being implemented in a system and/or released to consumers.

Very often, the number of components on an object under inspection (e.g., the capacitors, resistors, integrated circuits, etc. on a PCB under inspection) may be on the order of hundreds or thousands. Therefore, quality inspection directly by the human eye is often not reliable and economically feasible. For this purpose, companies, such as Agilent Technologies, VISIONx Inc, Omron Electronics LLC, Altest Corporation, and others, manufacture specialized automated optical inspection devices, like the Agilent SJ50 Series II and SP50 testers. In general, these systems are based on high quality real-time pictures of the object under inspection and decision-making algorithms that analyze the captured pictures to find possible faults in the manufacturing process.

Traditionally, a "model" or "template" (sometimes referred to as a "golden template") defining how an object under inspection is expected to appear is used for comparison with a captured image of the object under inspection to analyze whether the object under inspection is acceptable. That is, a comparison is made to determine whether there is any deviation in the captured image of the object under inspection from the template. Traditional methods typically utilize correlational analysis for comparing captured image data of an object under inspection with a template for such object. For example, a pixel-by-pixel comparison may be performed between the captured image and the template.

In many instances, however, variations in the captured images of an object from the template are not indicative of a problem. For example, a slight change in the amount of solder used at certain points on a PCB may cause the captured image thereof to deviate from the template, but the slight change may nevertheless be acceptable. As another example, components (e.g., capacitors, resistors, etc.) may be oriented slightly differently on a PCB than specified in a template, which may cause the captured image of the PCB to deviate from the template, but such PCB may nevertheless be acceptable. As another example, a component may be colored (e.g., painted) differently than specified in a template, but such component may nevertheless be acceptable. In other words, just because the captured image of an object under inspection deviates somewhat from the template often does not necessarily mean that the object under inspection is unacceptable (i.e., the object may still function properly).

So, template correlation is not itself a complete solution. To account for all acceptable variations, a large number of templates, each defining an acceptable variation, may be used. Because thousands of different appearances may be considered acceptable, implementing such a large number of templates is a very expensive method. For instance, a lot of time and/or resources (e.g., manpower) are required for determining the various templates that correspond to acceptable variations. Further, an undesirably large amount of storage capacity is required for storing the large number of templates. Additionally, the efficiency of the inspection process is hindered because of the increased number of comparisons required in determining whether a captured image matches any of the various templates.

In certain techniques, rather than performing correlation on a full template of a design, certain portions of the template are used for the correlational analysis. For example, certain joints (e.g., solder joints) on a PCB, which are a small portion of the template, may be analyzed. That is, a region of the captured image data corresponding to a region of the template may be compared for inspection of the object, rather than comparing the full captured image with the full template. Thus, while the template may consume thousands and sometimes millions of pixels, such template may be subdivided into smaller regions of interest that are used for the correlational analysis.

As an example, a template for an object (e.g., PCB) may be subdivided into, say, a 10×16 pixel region that is of interest. During the inspection process, the corresponding 10×16 pixel region of a captured image of an object under inspection may be compared with the 10×16 region of the template. More particularly, a pixel-by-pixel comparison may be performed for the 10×16 regions, thus resulting in a total of 160 comparisons to determine the amount of deviation in this region of the captured image relative to this region of the template.

While the number of comparisons required to be performed may be reduced by subdividing the template in the above manner (e.g., 160 comparisons may be performed, rather than thousands or millions of comparisons that may be required for comparing the full captured image with the full template), the correlational methods used may, as mentioned above, fail to allow for certain variations in a captured image that are not indicative of a problem. For example, an insubstantial difference in the region of the captured image that is being compared with the template may result in a large deviation computed by the correlational method. Just because the region of the captured image of an object under inspection deviates from the corresponding region of the template often does not necessarily mean that the object under inspection is unacceptable (i.e., the object may still function properly). Thus, templates for various acceptable variations of the region of interest may be required, which increases the number of comparisons that may be required (e.g., in order to compare a region of the captured image with a plurality of different acceptable templates for such region).

Further, creating the subdivided templates is a time-consuming task that is typically performed manually by a knowledgeable person. For instance, when a new PCB is developed, it sometimes takes weeks or even months for a knowledgeable person to determine all the suitable subdivisions of a template, including the acceptable variations, to be used for automated optical inspection of the product.

Various examples of prior automated optical inspection systems can be found in U.S. Pat. No. 5,640,200 titled "GOLDEN TEMPLATE COMPARISON USING EFFICIENT IMAGE REGISTRATION"; U.S. Pat. No. 5,640,199 titled "AUTOMATED OPTICAL INSPECTION APPARATUS"; U.S. Pat. No. 5,532,739 titled "AUTOMATED OPTICAL INSPECTION APPARATUS"; U.S. Pat. No. 4,972,359 titled "DIGITAL IMAGE PROCESSING SYSTEM"; and U.S. Pat. No. 5,333,052 titled "METHOD AND APPARATUS FOR AUTOMATIC OPTICAL INSPECTION".

BRIEF SUMMARY OF THE INVENTION

In view of the above, prior automated optical inspection techniques have several shortcomings. First, prior automated optical inspection techniques typically require a lot of time, effort, and knowledge/experience to determine proper templates that reflect an acceptable object. For instance, a lot of time (e.g., weeks or months) is typically required for a knowledgeable person to determine the proper subdivisions of a design template to be used for inspecting a given object, as well as determining the acceptable variations of such subdivision.

Further, prior automated optical inspection techniques typically require an undesirably large amount of data storage capacity for storing the templates. That is, storing templates corresponding to all of the acceptable variations of an object consumes an undesirably large amount of data storage capacity (e.g., memory). For instance, having a 10×16 pixel region of a template that has 100 acceptable appearance variations results in storage of (10×16)×100=16,000 pixels for the templates representing such region.

Further, prior automated optical inspection techniques are generally undesirably inefficient at computing the deviation of a captured image from the templates because of the large number of pixel-by-pixel comparisons made with each template. For instance, continuing with the above example of a 10×16 pixel region, 160 pixel-by-pixel comparisons are made for each template of such region used in the analysis. If a corresponding region of a captured image of an object under inspection fails to match a first template of such region, the corresponding region of the captured image may be compared with a next template, which may result in up to 16,000 pixel-by-pixel comparisons being made in the above example.

Additionally, prior automated optical inspection techniques are generally inflexible in that differences in the captured image that are of no consequence may result in a variation that either needs a template to reflect such variance as being acceptable or that causes the part to fail its inspection. For instance, differences in illumination may vary the brightness of portions of the captured image from the brightness of corresponding portions of a template, but such variations in brightness are not indicative of a problem in the object under inspection. As another example, a component of the object under inspection that is a different color (e.g., is painted a different color) than that of the corresponding component used in the template may result in a very large deviation, but such deviation in color is not indicative of a problem in the object under inspection. Thus, deviation from the template in certain image characteristics/features, such as brightness, color, etc. may be of no consequence to the inspection of the object. However, it may be undesirable to have templates that account for all of the different variations that may be encountered for such image characteristics that are of no consequence, as accounting for all of such variations may exponentially increase the total number of templates required to be developed, stored, and used in the correlational analysis process, thus further increasing the amount of development time and data storage consumed by the templates, and decreasing the efficiency of the processing technique (because of the increased number of pixel comparisons to be performed).

The present invention is directed to a system and method for performing optical inspection. In accordance with certain embodiments, at least one "invariant feature" of an object design is determined, and such invariant feature is used in inspecting objects having the corresponding design. As used herein, an "invariant feature" is a feature that is invariant to changes in certain transformations, such as shifts on the X-Y plane or monotonic brightness transformations, as examples. For instance, an invariant feature is a feature of an image that does not vary with changes in other imaging characteristics/features. For example, an edge of an image may be used as an invariant feature that does not vary with changes in brightness, color, etc. As described further herein, such "invariant feature" is used for inspecting object(s), and thus may also be referred to as an "inspection feature."

Certain embodiments are provided for creating a template that includes such invariant feature(s). That is, certain embodiments are provided for determining the invariant feature(s) of a design that are to be used as a template in inspecting objects. Accordingly, a template may comprise information corresponding to at least one pre-selected invariant feature of an object design. For example, in certain embodiments, a template may be created that includes pixel values for pixels consisting essentially of the invariant feature(s) of a design. The information stored for representing an invariant feature, such as an edge, may include sufficient pixels for accurately defining the edge. For instance, the template may include not only the pixels along the actual edge of a component, but may include some number of pixels on either side of the edge to enable recognition of the edge. For instance, in certain embodiments the template is a shape description of a feature that provides an intrinsic invariance to a specified set of basic transformations, such as shifts in the X-Y plane or monotonic brightness transformations. Accordingly, the amount of pixel values stored in a template may be minimized (e.g., storing the pixel values for only the invariant feature, rather than storing pixel values for a full image or subdivided region thereof). Thus, the amount of storage capacity required for storing the template information may be minimized, and (in many cases more importantly) the efficiency of the inspection process can be improved by reducing the number of pixel comparisons that are made.

Decreasing the number of selected pixels for the analysis, i.e., selecting only the relevant subset of pixels, provides an additional advantage to the decision making process, because it makes the penalty function more sensitive to the important changes in the object under analysis.

In accordance with various embodiments provided herein, the template may be created automatically, manually, or partially automatically and partially manually. For example, in one embodiment, a user may interact with a computer-aided design (CAD) program to select the invariant feature (s) of the design to be used in inspecting objects corresponding to such design. In another embodiment, a software program (e.g., an edge extraction program) may process the CAD file to extract out invariant feature(s), such as edges, that are to be used in inspecting objects corresponding to the design. In still another embodiment, a software program may extract out invariant feature(s) (e.g., edges) of a design, and a user may then select certain one(s) of the extracted invariant feature(s) to be used for inspecting objects. In still another embodiment, a user may interact with a CAD program to select certain regions of interest of the design (e.g., certain components or portions of the design), and a software program may be used to extract out the invariant feature(s) of the design from the selected regions of interest, which are to be used in inspecting objects.

In accordance with certain embodiments, penalties are associated with deviations in the corresponding invariant feature (e.g., edge) of a captured image relative to the template, and based on the determined penalty, the deviation is deemed either acceptable or unacceptable. For instance, in accordance with one embodiment, pre-selected invariant feature(s) are stored to a template. Various deviations from the invariant feature(s) are determined and corresponding penalties are assigned to each of the deviations. For example, the penalty associated with each deviation may reflect the impact that such deviation has on the object under inspection. For example, information defining an edge of a component, "component A," included in a PCB design may be stored to a template, wherein the defined edge identifies the shape and orientation of component A's edge. During inspection of a manufactured PCB, an image of the PCB may be captured, and the portion of the image corresponding to component A's edge may be analyzed to determine any deviation in component A's edge from that defined for such edge in the template. For instance, component A's edge in the manufactured PCB may be positioned and/or oriented slightly differently from that defined in the template. Based on the amount of deviation determined, the inspection system can determine whether the object under inspection is acceptable. For instance, the inspection system may determine a corresponding penalty that is associated with the determined deviation, and the inspection system may determine whether the penalty exceeds an acceptable threshold.

Accordingly, in certain embodiments, different templates for each of various acceptable variations of an object are not needed. Rather, in certain embodiments, a single template may be stored, along with associated penalty values assigned to corresponding types of deviations that may be detected. Thus, in certain embodiments, efficiency is improved in that correlation is performed between an acquired image (of an object under inspection) and the template (e.g., invariant features), and the determined amount of variation in the acquired image with the template (with respect to the invariant features) is used to determine a "penalty." The determined penalty can then be used to determine whether the object under inspection is acceptable. Accordingly, rather than performing correlation between an image of an object (or a given portion thereof) with a plurality of different templates corresponding to such object's design (or to such given portion thereof) for defining a plurality of acceptable variations in the object, in certain embodiments the correlation need only be performed with one template for each portion of the image that is inspected (e.g., for each component or for certain components that are of interest, etc.), and the results of that correlation are used to determine whether the variations, if any, in the object from the template (e.g., invariant features) are acceptable.

In accordance with at least one embodiment provided herein, correlational analysis is performed between defined (template) invariant feature(s) and the corresponding invariant feature(s) of an object under inspection. This approach provides several advantages. First, the pixels corresponding to the selected invariant feature(s) of an object are much fewer than the total pixels of a full image of the object under inspection, and thus performing the correlational analysis using only the invariant feature(s) significantly decreases the number of computations to be performed in the correlational analysis (e.g., typically at least by 10 percent). Additionally, because the analysis is restricted to pre-selected invariant feature(s), greater flexibility is permitted in the object being inspected. For example, a manufacturer may paint its parts a different color than originally expected in the design, and the inspection system can use the feature(s) that are invariant to such color changes (e.g., the component edges) for performing the inspection. Thus, changes in characteristics to which the selected inspection features (e.g., selected edges) are invariant, e.g., changes in color, brightness, etc., are permissible without affecting the inspection system's analysis of an object under inspection.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated that the conception and specific embodiment disclosed may be readily utilized as a basis for modifying or designing other structures for carrying out the same purposes of the present invention. It should also be realized that such equivalent constructions do not depart from the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawing, in which:

FIGS. 2A-2C show a simple example of a design for an object, and more particularly shows an example design for a PCB, wherein FIG. 2A shows the example design and FIGS. 2B and 2C each show example invariant features (edges in this example) that may be selected for use in performing automated optical inspection of objects having such design;

DETAILED DESCRIPTION OF THE INVENTION

Figure 1:
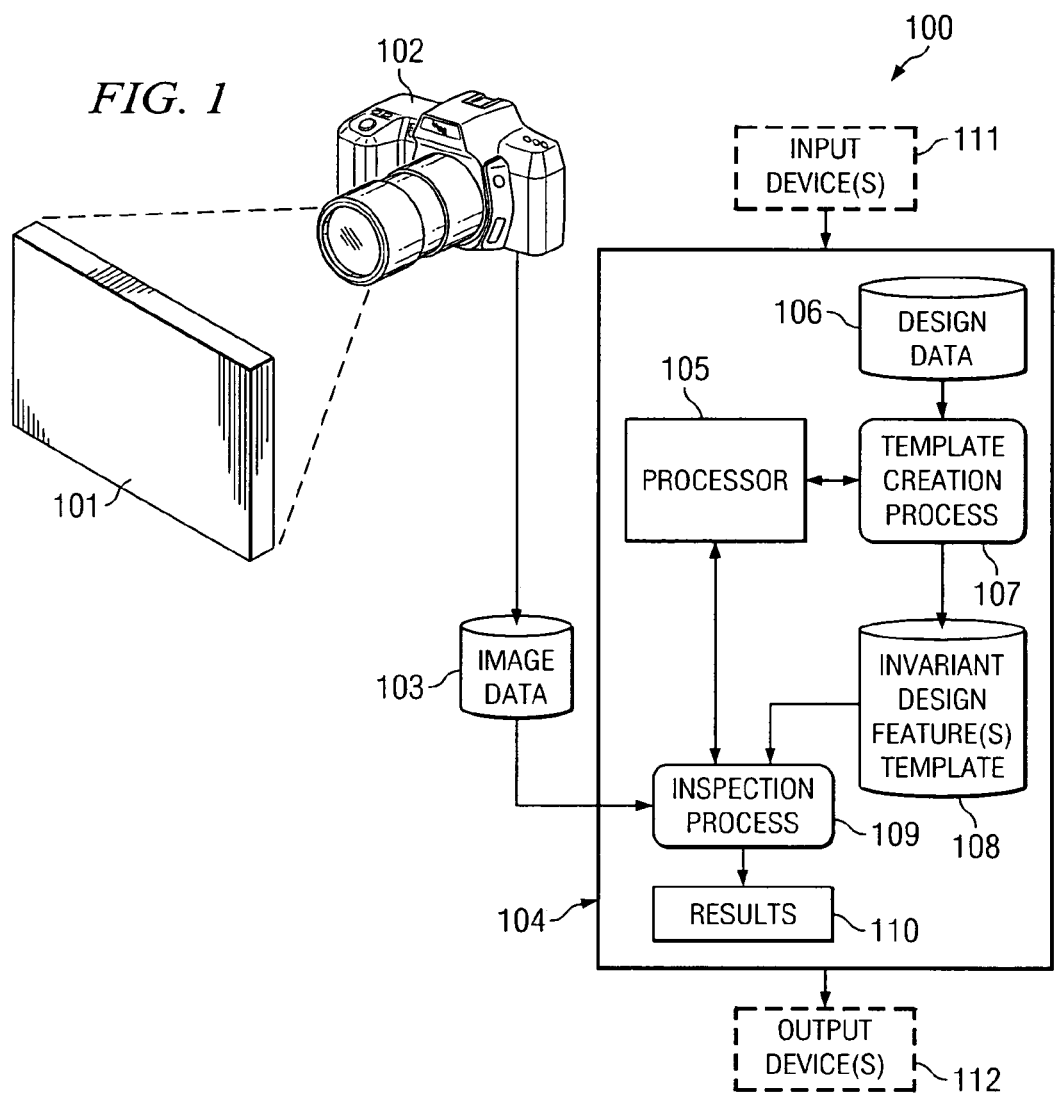
FIG. 1 shows an example inspection system in accordance with one embodiment of the present invention.

Various embodiments are provided herein that use preselected invariant features of a design for inspecting objects (e.g., products) corresponding to such design. In accordance with certain embodiments, a shape description of a design is determined, which has an intrinsic invariance to a specified set of basic transformations, like the shifts in the X-Y plane or monotonic brightness transformations, as examples. Such shape description that is invariant to specified transformations is then used as a template or model for evaluating captured images of objects under inspection. In certain embodiments, the invariant feature(s) to be used in the inspection process may be automatically determined (e.g., through computerized analysis of a digitized representation of a design, such as a CAD file for the design) and/or specified by a user (e.g., through manual selection of such invariant feature(s) to be used by, for instance, highlighting such features in a CAD representation of the design).

In certain embodiments, the transformations to which the inspection feature(s) are invariant may be specified. Such transformations that may be specified include, as examples, brightness, color, shift, rotation, scaling, and/or shape. For instance, in one embodiment, a user may select the transformation(s) to which the inspection feature(s) are to be invariant, and a software program may then perform the proper operations on a CAD file for identifying inspection feature(s) of the design that are invariant to the selected transformations. For example, a user may select that the inspection features are to be invariant to brightness and color transformations, and a software program may identify edges of a design in a CAD file, which are invariant to brightness and color transformations.

In a preferred embodiment, one or more edges included in an object under inspection (e.g., of the object itself or component parts of the object) are invariant features that are used as inspection features for inspecting the object. Such edges may be invariant, for example, to brightness, color, shift, rotation, and scaling.

Accordingly, the pixel value information that is stored for the template can be significantly reduced in accordance with certain embodiments provided herein. For instance, rather than storing pixel value information for an entire design or for entire regions of interest, pixel value information may be stored essentially for the invariant features (e.g., edges) of the design. Further, rather than storing a large number of templates showing the various acceptable deviations in the invariant features (e.g., X-Y shifts in the edges, changes in edge orientation, etc.), penalties are associated with various types of deviations in certain embodiments. Thus, the amount of deviation of the corresponding inspection feature(s) (e.g., edges) in a captured image of an object under inspection relative to the template of such inspection feature(s) may be used to determine a corresponding penalty for such deviation. The determined penalty may then be evaluated to determine whether it is acceptable. Accordingly, in certain embodiments, different templates are not needed for representing different acceptable variations of an object under inspection, further aiding in minimizing the amount of data storage required, as well as minimizing the number of correlation computations to be performed (as a plurality of different templates representing different acceptable variations need not be analyzed). As described further below, various embodiments of an automated optical inspection system and method are advantageous in that efficiency in computation is enhanced, while permitting greater flexibility in certain "variable" aspects of a design (e.g., permitting color changes, changes in brightness during the image capture of an object under inspection, etc.).

FIG. 1 shows an example inspection system 100 in accordance with one embodiment of the present invention. Inspection system 100 includes an imaging device 102 that is operable to capture image data 103 for an object 101 that is under inspection. Depending on the capabilities of the imaging device 102 utilized, image data 103 may be visual image data, X-ray image data, or any other types of image data desired to be used for inspecting object 101. A processing system 104 includes a processor 105 for executing processes, such as template creation process 107 and inspection process 109, as shown. Design data 106 is processed by template creation process (e.g., software) 107 to generate an invariant design feature(s) template 108. In certain implementations, the design data 106 may be a CAD file representing an object's design, for example. As another example, in certain implementations, the design data 106 may be an image of an actual object that is considered acceptable or optimal. For instance, a manufactured PCB board that is acceptable (or optimal) may be imaged and such image data may be used as design data 106. As mentioned above, template creation process 107 may be an autonomous process or it may be a process that uses information input from a user, as may be input via input device(s) 111, such as a keyboard, mouse, and/or other input devices, that are communicatively coupled to processing system 104. An example operational flow for such template creation process 107 for creating an invariant design feature(s) template 108 in accordance with one embodiment is described further below in connection with FIG. 4.

Inspection process 109 executes to analyze the captured image data 103 for an object 101 under inspection in accordance with invariant design feature(s) template 108 to determine results 110. An example operational flow for such inspection process 109 for using invariant design feature(s) template 108 for analyzing captured image data 103 in accordance with one embodiment is described further below in connection with FIG. 5. The results 110 and/or other information (e.g., design data 106) may be presented to a user on output device(s) 112, such as a display, printer, and/or other output devices, that are communicatively coupled to processing system 104.

The example inspection system 100 of FIG. 1 is merely one type of inspection system in which embodiments of the present invention may be employed. Invariant design feature(s) template 108 may be created and/or used in various other types of inspection systems for analyzing an object 101 under inspection, and thus embodiments of the present invention are not limited to the example architecture of system 100 of FIG. 1.

Figure 2A:
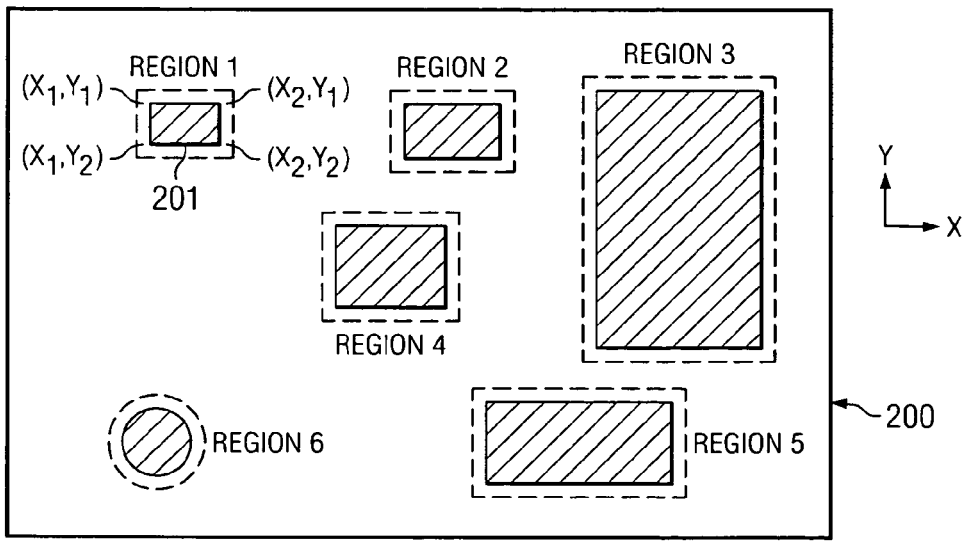
Figure 2B:
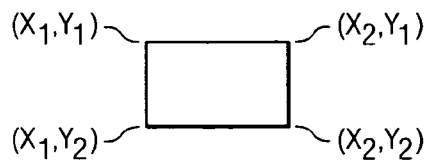
Figure 2C:
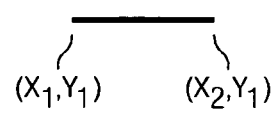

FIGS. 2A-2C show a simple example of a design for an object, and more particularly shows an example design for a PCB. While the example of FIGS. 2A-2C are for inspecting a PCB, the embodiments provided herein are not limited in application to inspection of PCBs, but may be applied to other types of objects as well. FIG. 2A shows an example design 200 for a PCB that includes various components, such as component 201. Component 201 may be, as examples, an integrated circuit (IC), capacitor, resistor, power supply, or any other component that may be implemented on a PCB. In this example of FIG. 2A, component 201 is arranged having its four corners at coordinates (X1,Y1), (X2,Y1), (X1,Y2), and (X2,Y2). Various regions of the design may be of interest for inspection. For instance, regions 1-5 are shown as example regions of interest in the inspection of design 200. In certain embodiments, a user may interact with a CAD program to select such regions that are of interest for inspecting the PCB. As described further below with reference to component 201 in region 1, invariant feature(s) may be selected in the specified regions of interest for use in inspecting an object.

FIG. 2B shows one example of a template that may be formed for use in examining component 201, which includes just its edge features. FIG. 2C shows another example of a template that may be formed for use in examining component 201, which includes just its top edge feature. Thus, all edge features of a component may be unnecessary for the inspection process in certain embodiments. As described further herein, by selecting invariant feature(s) within design 200, such as edge(s) of component 201, those invariant feature(s) may be advantageously used in the inspection of objects to provide a flexible and efficient inspection process. As mentioned above, the identification of the edge(s) of component 201 (of FIGS. 2B and 2C) that are to be used for inspection may be performed autonomously by edge-detection software; such selection may be performed manually by a user (e.g., by a user highlighting the edge(s) of component 201); or such selection may be a combination of an autonomous process and manual selection (e.g., an autonomous process may identify all edges, such as in FIG. 2B, and a user may input information selecting one or more of the identified edges to be used, such as the top edge of FIG. 2C).

Figure 3:
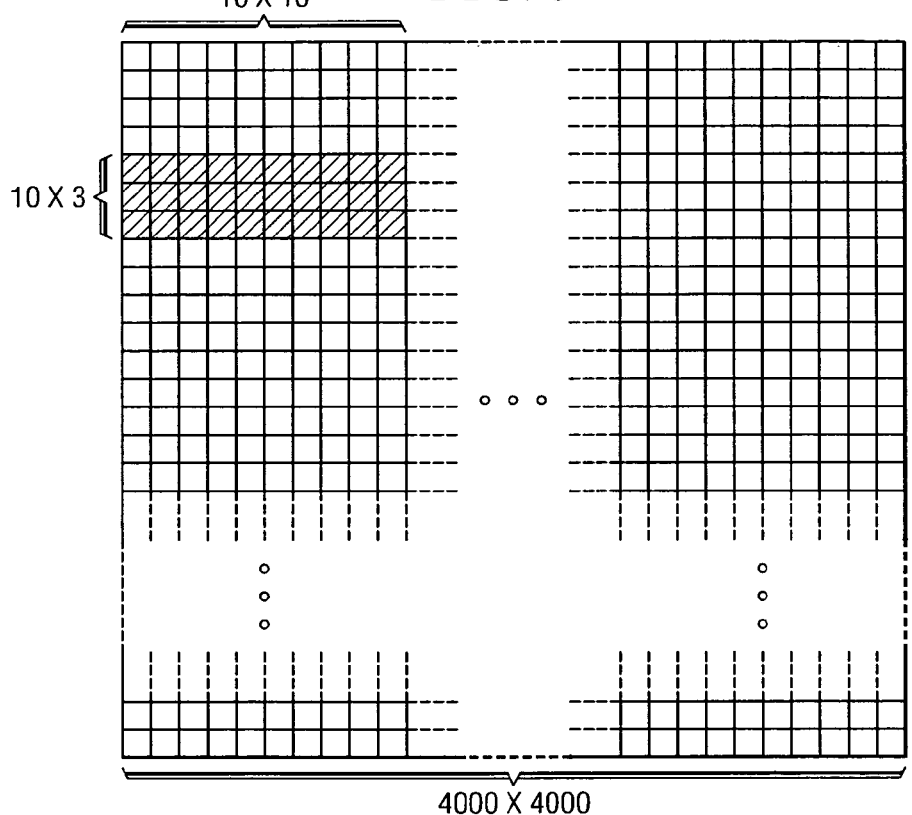
FIG. 3 shows a group of pixels, such as may be captured by an imaging device of an inspection system.

FIG. 3 shows a group of pixels, such as may be captured by an imaging device of an inspection system. Typically, a captured image includes thousands or millions of pixels. As examples, Agilent's 5DX X-ray-based Printed Circuit Board inspection machine produces source images of 1024×1024 pixels, and many visual inspection machines produce pictures ranging from 500×500 to 4000×4000 pixels. In the example of FIG. 3, the captured picture contains 4000×4000 pixels. As further shown, a sub-portion of the captured pixels, such as a region with 10×16 pixels, is included in the captured image. In prior inspection techniques, such a sub-region (e.g., of 10×16 pixels) may be used for analysis. More particularly, correlation is typically performed such that a pixel-by-pixel comparison is made, thus requiring 160 comparison operations to be performed in analyzing the 10×16 sub-region.

As further shown by the shaded region of FIG. 3, certain embodiments provided herein allow a smaller number of pixels to be used for analysis, such as a 10×3 region of pixels that correspond to an invariant inspection feature (e.g., an edge of a component). Thus, it can be seen that using the pixels of an invariant inspection feature (e.g., the pixels for representing an edge of a component) may require much fewer pixels to be stored and compared in the inspection analysis than a technique that uses all X×Y pixels of a captured image (e.g., all 4000×4000 pixels of the image of FIG. 3) or all pixels of a sub-region (e.g., 10×16 in this example).

Figure 4:
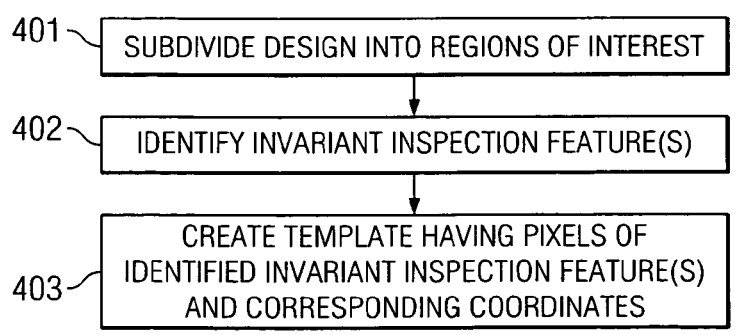
FIG. 4 shows a flow diagram for creating a template for use in an automated optical inspection system in accordance with one embodiment of the present invention.

FIG. 4 shows a flow diagram for creating a template for use in an automated optical inspection system in accordance with one embodiment of the present invention. As shown, in block 401 a design (such as the PCB design 200 of FIG. 2A) is subdivided into regions of interest. For instance, a user may interact with a CAD file and specify one or more regions of the design that are of interest (e.g., regions 1-5 of the example of FIG. 2A) for use in inspecting objects. In certain embodiments, operation 401 may be omitted and the entire design may be considered a region of interest. In block 402, invariant inspection feature(s) (e.g., edges) are identified in the regions of interest. For instance, the edge(s) of component 201 shown in FIGS. 2B and 2C may be determined as invariant inspection feature(s) within region 1 of the example design 200 of FIG. 2A. These invariant inspection features may be identified automatically, e.g., using edge-detection software, or they may be identified manually (by a user highlighting the features to be used). In block 403, an inspection template is created for the design, which has pixels of the identified invariant inspection feature(s) and their corresponding coordinates. Thus, the inspection template may identify the pixel values of the invariant inspection feature(s) and the coordinates identifying a relative location on the object at which such invariant inspection feature(s) are expected to be located.

Thus, as described with FIG. 3 above, fewer pixels are stored in the inspection template than are stored in traditional techniques. Further, in performing pixel-by-pixel correlation with a captured image (during inspection), fewer comparisons/computations are performed than in traditional techniques. And, using such invariant inspection feature(s) in the template allows greater flexibility in other features ("variant" or "variable" features) of the device under inspection. For instance, the color, brightness, etc., of various components may change without altering the selected invariant inspection feature(s) (e.g., edges).

Figure 5:
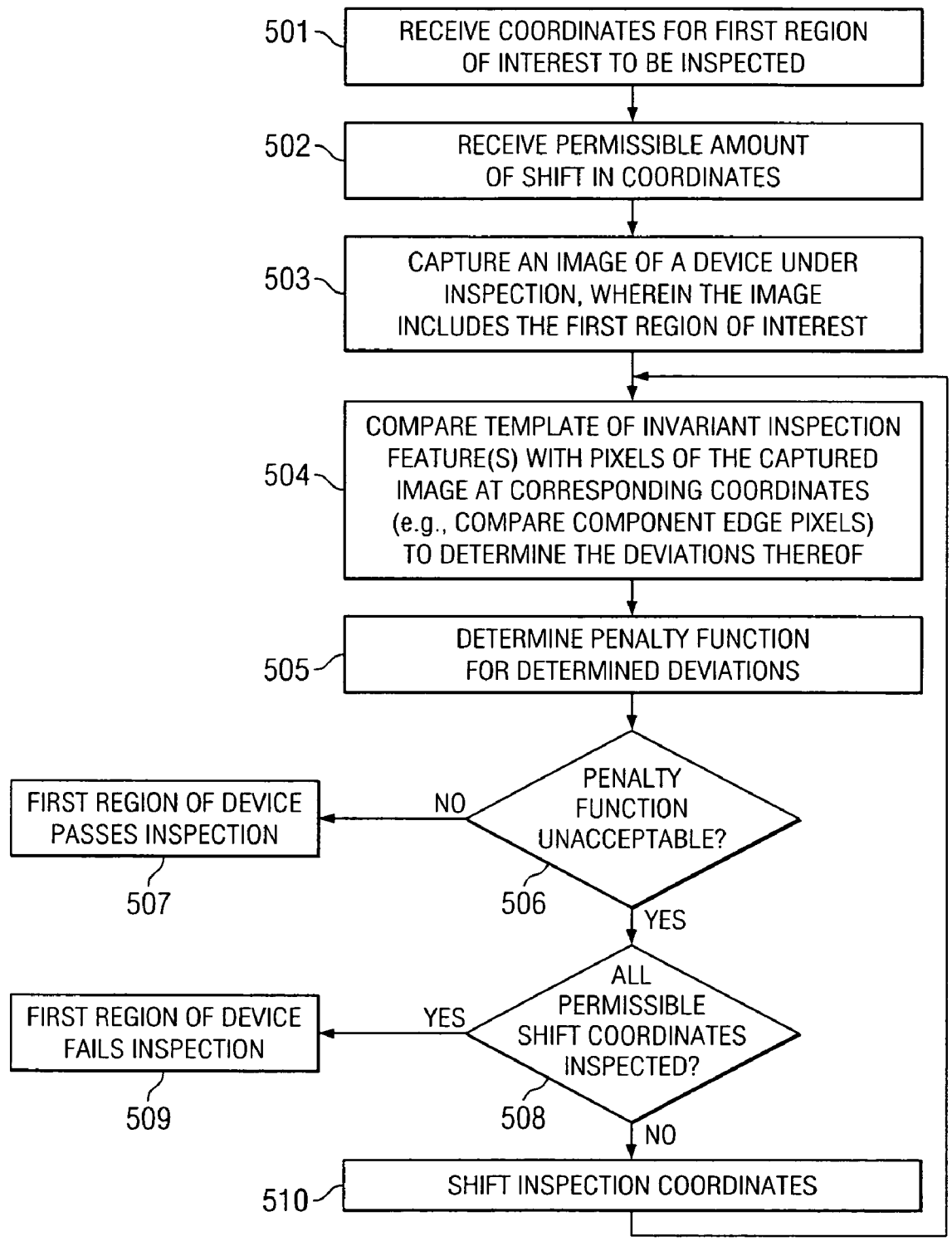
FIG. 5 shows an example inspection process using the inspection template created in FIG. 4 in accordance with one embodiment.

FIG. 5 shows an example inspection process using the inspection template created in FIG. 4 in accordance with one embodiment. As shown, in block 501, the inspection system receives the coordinates for a first region of interest to be inspected on a device. In block 502, the inspection system receives an indication of the permissible amount of shift in coordinates, if any. For instance, as mentioned above, an inspection template may include coordinates identifying the relative location within an object under inspection at which a given invariant feature is expected to reside. A certain tolerance in shifting of the coordinate system may be specified by the user in block 502 (e.g., to account for slight inaccuracies in the positioning of the object under inspection relative to the imaging system).

In block 503, the inspection system captures an image of a device under inspection, wherein the image includes at least the first region of interest (and may also include other regions of interest in some instances). In block 504, the inspection system compares the template of invariant inspection feature(s) for this first region of interest with pixels of the captured image at corresponding coordinates (e.g., pixels between coordinates (X1,Y1) and (X2,Y1) when using the example template of FIG. 2B) to determine an amount, if any, of deviation in this invariant feature in the captured image from that of the template.

In block 505, a penalty function is determined for the deviation. As mentioned above, in certain embodiments, penalty values may be pre-assigned to corresponding types of deviations, and in block 505, the corresponding penalty value for a determined deviation may be determined.

In block 506, the inspection system determines whether the penalty function is unacceptable (e.g., too high). For instance, threshold may be pre-specified by a user, which indicates the penalty values that are indicative of deviations that are acceptable versus those that are unacceptable (e.g., penalty values below the threshold may be indicative of deviations that are acceptable, while penalty values above the threshold are indicative of deviations that are unacceptable). If determined in block 506 that the penalty function is acceptable (e.g., is sufficiently low to indicate an acceptable deviation), then in block 507 the first region of the device under inspection passes inspection.

If the penalty function is unacceptable in block 506, then in block 508 the inspection system determines whether a shift in the image coordinates is permissible. For instance, a permissible amount of shift in the coordinates of an invariant feature may be specified in block 502, and block 508 determines whether such a permissible shift has been specified for the invariant feature under consideration. If all permitted coordinate shifts have not yet been evaluated, then in block 510 the coordinates are shifted (e.g., the coordinates of the portion of the captured image at which the invariant feature is expected to reside are shifted by a permissible amount along the X and/or Y axes), and operation returns to bock 504. If all of the permitted coordinate shifts have been evaluated, then the first region of the device under inspection fails its inspection in block 509. Of course, this operation may be performed for any number of regions of interest, and if any regions of interest (or an unacceptable number of such regions of interest) fail their respective inspection, then the object under inspection may be deemed by the automated optical inspection system to fail inspection.

A monotonic brightness transformation is a transformation of an image which changes the brightness of pixels, but does not change the order of brightness: i.e. the brightest of any two pixels chosen in the image remains the brightest of the two pixels after the transformation. For example, the monotonic brightness transformation is observed if the light source used in the image capture process dims or brightens.

As mentioned above, in certain embodiments a penalty function is used in evaluating an image of an object under inspection (e.g., to determine whether a computed deviation in the invariant feature(s) of the captured image from the defined invariant feature(s) of the template is acceptable). One example of a penalty function is one that possesses a property to be invariant to monotonic brightness transformations. In accordance with certain embodiments, an inspection template is a set of coordinates of pairs of pixels. In each pair, one pixel is located in the area where the image should have a brighter pixel, and one pixel is located in a darker area of the image (e.g., to define an edge in the image). The pixels' coordinates are referred to as defining a "shape" of an inspection feature. When the template is applied to the image under analysis, the penalty may be calculated as a function of the number of pairs in which the observed brightness in the captured image is reversed relative to the brightness specified in the template. That is, the penalty function may be computed as a function of the number of pairs observed in the captured image of the object under inspection in which an incorrect one of the pixels in the pair is brighter than the other pixel of the pair (e.g., for a given pair observed in the captured image, a first pixel of the pair is brighter than the second pixel of the pair) than specified in the template for such pair (e.g., the template defines that for the given pair, the second pixel is brighter than the first pixel). Clearly such a template is an invariant to the monotonic brightness transformation. To provide a degree of invariance toward other permitted transformations, the spatial location of pairs in the template is chosen in such a way that the penalty function increases only when the image under analysis manifests an important change in the bright-dark pattern of pixels, like the case when the shape on the inspection feature under evaluation in the captured image significantly deviates from the shape defined by the template.

As another example, a set of pairs can be applied to the spatial derivatives of the source image to detect an edge of a required orientation and brightness on either side of the edge. In this case, one pixel of the pair will reside before a boundary (edge), and the second one immediately across the boundary. The pairs in such template are able to distinguish between cases when an edge has a brighter area, for instance say, to the left of the edge, from the case in which the brighter area is located to the right of the edge. As still another example, when only the presence of the edge is important (i.e. the exact pattern of brightness on each side of the edge is irrelevant to the task), the absolute value of the spatial derivatives can serve as a "source image" for the corresponding template. Of course, any other suitable technique for representing invariant features (e.g., the shape of an edge or other type of inspection feature) in a template in a manner that is invariant to one or more transformations (e.g., monotonic brightness transformations, etc.) may be used in accordance with the above-described embodiments for automated optical inspection of objects.

In view of the above, various embodiments are provided for performing automated optical inspection. As detailed above, invariant features may be identified and used to allow for efficiency in the automated optical inspection process. For example, in certain embodiments, a template is created that includes information defining at least one inspection feature in a manner that is invariant to at least one type of transformation occurring in a captured image of an object under inspection. For instance, the inspection feature may be one or more edges that are expected in the captured image of the object under inspection (e.g., edges of components on a PCB under inspection). The information in the template may define the shape of the inspection feature (e.g., coordinates of the edges to be used in the inspection process) and define the inspection feature in a manner that is invariant to one or more types of transformations that may occur in the captured image of the object under inspection, such as transformations in monotonic brightness, color, etc. Thus, the presence and orientation of the inspection feature within the object under inspection can be evaluated, while deviations in brightness, color, and other types of transformations in the captured image of the object are ignored. Accordingly, use of the selected invariant features allows the automated inspection process to be performed very efficiently, as the total number of pixels that are correlated are minimized (to those pixels corresponding to the specified inspection feature(s), e.g. edge(s)), and such use of the selected invariant features in the inspection process permits great flexibility in the implementation of the object under inspection, such as allowing for changes in color in components of the object, changes in brightness of the light source used during the image capture process, etc (because the invariant features are "invariant" to those transformations), without requiring a separate template to be used for inspecting all of the different acceptable variations.

As described above, traditional automated optical inspection techniques utilize so-called "golden" templates in which pixel-by-pixel correlation between a captured image (or region thereof) and the golden template (or region thereof) is performed. Thus, deviations in features of the captured image (or region thereof) from the golden template (or region thereof) that are not important to the inspection process must be accounted for by use of further templates in the inspection process or the deviations in such features may result in too rigid of an inspection process. For instance, a traditional golden template defining pixel values expected for a captured image of an object under inspection is inflexible to deviations in color of components of the object under inspection and/or deviations in brightness of the light source used during the image capture process.

Embodiments described above provide greater flexibility by defining inspection features in a manner that is invariant to one or more transformations, such as monotonic brightness transformations and/or color transformations, that may occur in the captured image of an object under inspection. For instance, in one implementation, the inspection features (e.g., edges) to be used in inspecting an object are defined with information specifying a plurality of pairs of pixels (e.g., specifying each pixel's coordinate) and information specifying the relative brightness of the pixels in each pair (e.g., which pixel in each pair is the brightest). Thus, by defining the inspection feature with regard to the relative brightness of pixels, rather than as specific pixel values (as in traditional templates used for automated optical inspection processes), such inspection feature is defined in a manner that is invariant to monotonic brightness transformations. For instance, by specifying that a first pixel (at a first coordinate) of a pair is brighter than a second pixel (at a second coordinate) of the pair, the template is sufficiently flexible to allow for monotonic brightness transformations in the captured image of an object under inspection (e.g., the light source used for the capture of the image of the object under inspection may be greater or less than expected, and the relative brightness of the pixels in each pair should still correspond to that specified in the template). Various other techniques of defining inspection features in a manner that is invariant to one or more transformations (which may be selected by a user) may be used in embodiments of the present invention. Accordingly, as described above, embodiments of the present invention provide an efficient and flexible technique for performing automated optical inspection.

Although the present invention and its advantages have been described in detail, it should be understood that various changes, substitutions and alterations can be made herein without departing from the invention as defined by the appended claims. Moreover, the scope of the present application is not intended to be limited to the particular embodiments of the process, machine, manufacture, composition of matter, means, methods and steps described in the specification. As one will readily appreciate from the disclosure, processes, machines, manufacture, compositions of matter, means, methods, or steps, presently existing or later to be developed that perform substantially the same function or achieve substantially the same result as the corresponding embodiments described herein may be utilized. Accordingly, the appended claims are intended to include within their scope such processes, machines, manufacture, compositions of matter, means, methods, or steps.

What is claimed is:

1. A template for use in automated optical inspection of an object, the template comprising:
   information defining at least one inspection feature in a manner that is invariant to at least one type of transformation occurring in a captured image of said object, the information enabling evaluation of a captured image of the object to determine an amount, if any, of deviation of at least a portion of the captured image from the at least one inspection feature with respect to another type of transformation.

2. The template of claim 1 wherein said at least one type of transformation to which said at least one inspection feature is invariant is selected by a user.

3. The template of claim 2 wherein said at least one type of transformation is selected by the user from the group consisting of:
   monotonic brightness, color, shift, rotation, and scaling.

4. The template of claim 1 wherein said at least one inspection feature comprises at least one edge expected in said captured image of said object.

5. The template of claim 4 wherein said information defines a shape of said at least one edge.

6. The template of claim 4 wherein said at least one edge is invariant to at least one transformation selected from the group consisting of:
   monotonic brightness, color, shift, rotation, and scaling.

7. The template of claim 1 wherein said information defining said at least one inspection feature comprises:
   information corresponding to a plurality of pairs of pixels, wherein for each pair of pixels said information identifies coordinates of each pixel in the pair and said information identifies which pixel in the pair is the brightest.

8. The template of claim 7 wherein said information corresponding to said plurality of pairs of pixels is provided only for said at least one inspection feature.

9. The template of claim 8 wherein said at least one inspection feature is pre-selected for use in inspection of said object.

10. The template of claim 8 wherein each of said at least one inspection feature corresponds to an edge expected in said captured image of said object.

11. The template of claim 7 further comprising:
    a penalty function for computing a penalty as a function of a number of pairs of pixels in said captured image of said object in which the brightest one of the pixel in such pair is not the one specified by said information of said template.

12. The template of claim 11 consisting essentially of said information defining at least one inspection feature.

13. The template of claim 1 further comprising:
    a penalty function for computing a penalty associated with deviations in said captured image of said object under inspection relative to said defined at least one inspection feature.

14. The template of claim 1 wherein said object is a printed circuit board.

15. The template of claim 14 wherein said at least one inspection feature is at least one edge of at least one component on the printed circuit board.

16. A template for use in automated optical inspection of an object, the template comprising:
    information for a plurality of pairs of pixels, wherein for each pair of pixels said information identifies coordinates of each pixel in the pair and said information identifies which pixel in the pair is the brightest, whereby said information defines at least one inspection feature in a manner that is invariant at least to a monotonic brightness transformation in a captured image of said object, the information corresponding to said plurality of pairs of pixels being provided only for said at least one inspection feature, which is pre-selected for use in inspection of said object.

17. The template of claim 16 wherein said at least one inspection feature comprises at least one edge expected in said captured image of said object.

18. The template of claim 16 wherein said at least one inspection feature is further invariant to at least one transformation selected from the group consisting of:
    color, shift, rotation, and scaling.

19. The template of claim 16 wherein each of said at least one inspection feature corresponds to an edge expected in said captured image of said object.

20. The template of claim 16 further comprising:
a penalty function for computing a penalty as a function of a number of pairs of pixels in said captured image of said object in which the brightest one of the pixel in such pair is not the one specified by said information of said template.

21. The template of claim 16 consisting essentially of said information.

22. A method comprising:
determining at least one inspection feature of a design;
storing, to a computer-readable medium, information representing said at least one inspection feature in a manner that is invariant to at least one type of transformation occurring in a captured image of an object under inspection; and
using said stored information for performing automated optical inspection of at least one object under inspection to determine an amount, if any, of deviation of at least a portion of a received captured image from the at least one inspection feature with respect to at least a second type of transformation.

23. The method of claim 22 further comprising:
receiving a selection of said at least one type of transformation to which said at least one inspection feature is invariant.

24. The method of claim 22 wherein said determining at least one inspection feature of a design comprises:
a user selecting said at least one inspection feature of said design.

25. The method of claim 24 wherein said at least one inspection feature comprises at least one edge expected in a captured image of said at least one object under inspection.

26. The method of claim 22 wherein said determining at least one inspection feature of a design comprises:
a software program determining said at least one inspection feature of said design.

27. The method of claim 26 wherein said at least one inspection feature comprises at least one edge expected in a captured image of said at least one object under inspection and wherein said software program comprises an edge detection program.

28. The method of claim 22 wherein said at least one type of transformation to which said inspection feature is invariant comprises at least one selected from the group consisting of:
monotonic brightness, color, shift, rotation, and scaling.

29. The method of claim 22 wherein said at least one inspection feature comprises at least one edge expected in said captured image of said object.

30. The method of claim 22 wherein said stored information comprises:
information corresponding to a plurality of pairs of pixels, wherein for each pair of pixels said information identifies coordinates of each pixel in the pair and said information identifies which pixel in the pair is the brightest.

31. The method of claim 30 wherein said information corresponding to said plurality of pairs of pixels is stored only for said at least one inspection feature.

32. The method of claim 30 further comprising:
creating a penalty function for computing a penalty as a function of a number of pairs of pixels in a captured image of said at least one object under inspection in which the brightest one of the pixel in such pair is not the one specified by said information of said template.

33. The method of claim 30 wherein said using said stored information for performing automated optical inspection of at least one object under inspection further comprises:
computing a penalty as a function of a number of pairs of pixels in a captured image of said at least one object under inspection in which the brightest one of the pixel in such pair is not the one specified by said information of said template.

34. A method comprising:
selecting, for use in performing automated optical inspection of at least one object corresponding to a given design, at least one edge included in said design;
storing, to a computer-readable medium, information representing said at least one edge in a manner that is invariant at least to a monotonic brightness transformation occurring in a captured image of said at least one object; and
using said stored information for performing automated optical inspection of said at least one object under inspection to determine an amount, if any, of deviation of at least a portion of a received captured image from the at least one inspection feature with respect to at least another type of transformation.

35. The method of claim 34 wherein said selecting said at least one edge comprises:
a user selecting said at least one edge.

36. The method of claim 34 wherein said selecting said at least one edge comprises:
a software program selecting said at least one edge of said design.

37. The method of claim 34 wherein said at least one type of transformation to which said edge is invariant further comprises at least one selected from the group consisting of: color, shift, rotation, and scaling.

38. The method of claim 34 wherein said stored information comprises:
information corresponding to a plurality) of pairs of pixels, wherein for each pair of pixels said information identifies coordinates of each pixel in the pair and said information identifies which pixel in the pair is the brightest.

39. The method of claim 38 wherein said using said stored information for performing automated optical inspection of at least one object under inspection further comprises:
computing a penalty as a function of a number of pairs of pixels in a captured image of said at least one object under inspection in which the brightest one of the pixel in such pair is not the one specified by said information of said template.

40. A system for automated optical inspection comprising:
means for storing information representing at least one inspection feature of a design in a manner that is invariant to at least a first type of transformation occurring in a captured image of an object under inspection; and
means for receiving said captured image of said object under inspection and using the stored information for analyzing at least a portion of the received captured image to determine an amount, if any, of deviation of said at least a portion of the received captured image from the at least one inspection feature with respect to at least a second type of transformation.

41. The system of claim 40 wherein said at least a first type of transformation comprises at least one selected from the group consisting of:

monotonic brightness, color, shift, rotation, and scaling of said at least one inspection feature.

42. The system of claim 41 wherein said at least a second type of transformation comprises at least one selected from the group consisting of:
presence of said at least one inspection feature, and orientation of said at least one inspection feature.

43. The system of claim 40 further comprising:
means for determining if the determined amount of deviation exceeds a threshold.

44. The system of claim 40 further comprising:
means for capturing said captured image.

45. The system of claim 40 wherein said means for storing stores information comprising:
information corresponding to a plurality of pairs of pixels, wherein for each pair of pixels said information identifies coordinates of each pixel in the pair and said information identifies which pixel in the pair is the brightest.

46. The system of claim 45 wherein said means for determining comprises:
means for computing a penalty as a function of a number of pairs of pixels in a captured image of said at least one object under inspection in which the brightest one of the pixel in such pair is not the one specified by said information of said template.

47. The system of claim 46 wherein said computed penalty corresponds to said amount of deviation.

48. A system for automated optical inspection comprising:
computer-readable data storage having stored thereto information representing at least one edge of a design in a manner that is invariant to at least one type of transformation occurring in captured image data of an object under inspection;
imaging system arranged to capture said image data of said object under inspection; and
processor operable to analyze at least a portion of the captured image data to determine whether said object under inspection is acceptable based on an amount, if any, of deviation of said at least a portion of the captured image data from the at least one edge with respect to some transformation other than said at least one type of transformation.

49. The system of claim 48 wherein said at least one type of transformation comprises at least one selected from the group consisting of:
monotonic brightness, color, shift, rotation, and scaling of said at least one edge.

50. The system of claim 49 wherein said transformation other than said at least one type of transformation comprises at least one selected from the group consisting of:
presence of said at least one edge, and orientation of said at least one edge.

51. The system of claim 48 wherein said information representing said at least one edge comprises;
information corresponding to a plurality of pairs of pixels, wherein for each pair of pixels said information identifies coordinates of each pixel in the pair and said information identifies which pixel in the pair is the brightest.

52. The system of claim 51 wherein said processor is operable to compute a penalty as a function of a number of pairs of pixels in said captured image data of said object under inspection in which the brightest one of the pixel in such pair is not the one specified by said information representing said at least one edge.

53. The system of claim 52 wherein said computed penalty corresponds to said amount of deviation.

54. A method comprising:
determining at least one invariant feature of a design, wherein said at least one invariant feature is invariant to at least one type of transformation occurring in captured image data of an object under inspection;
associating penalties with deviations from said at least one invariant feature; and
analyzing said captured image data of said object under inspection to determine if said object under inspection is acceptable based at least in part on any deviation in said image data from said at least one invariant feature in some transformation other than said at least one type of transformation.

55. The method of claim 54 wherein said at least one type of transformation comprises at least one selected from the group consisting of:
monotonic brightness, color, shift, rotation, and scaling of said at least one invariant feature.

56. The method of claim 55 wherein said transformation other than said at least one type of transformation comprises at least one selected from the group consisting of:
presence of said at least one invariant feature, and orientation of said at least one invariant feature.

57. The method of claim 54 wherein said at least one transformation to which said at least one invariant feature is invariant is specified by a user.

58. The method of claim 54 wherein said analyzing comprises:
determining said any deviation in said image data from said at least one invariant feature;
determining a penalty associated with the determined deviation; and
determining whether said penalty exceeds a threshold.

* * * * *

UNITED STATES PATENT AND TRADEMARK OFFICE
CERTIFICATE OF CORRECTION

PATENT NO. : 7,366,321 B2
APPLICATION NO. : 10/871963
DATED : April 29, 2008
INVENTOR(S) : Usikov It is certified that error appears in the above-identified patent and that said Letters Patent is hereby corrected as shown below:

In column 16, line 39, delete "plurality)" and insert -- plurality --, therefor.

In column 18, line 2, delete "comprises;" and insert -- comprises: --, therefor.

Signed and Sealed this

Fourteenth Day of October, 2008

JON W. DUDAS
*Director of the United States Patent and Trademark Office*